United States Patent [19]

Schneider

[11] Patent Number: 5,509,535
[45] Date of Patent: Apr. 23, 1996

[54] FLOTATION APPARATUS

[75] Inventor: John C. Schneider, Acton, Canada

[73] Assignee: Hydrochem Developments Ltd., Brampton, Canada

[21] Appl. No.: 273,682

[22] Filed: Jul. 12, 1994

[51] Int. Cl.[6] ............... B03D 1/16; B03D 1/20; B03D 1/24
[52] U.S. Cl. ............... 209/169; 209/170; 210/221.2; 210/322
[58] Field of Search .................... 209/168, 169, 209/170; 210/221.2, 322, 319, 320, 221.1

[56] References Cited

U.S. PATENT DOCUMENTS

| | | |
|---|---|---|
| 1,155,861 | 10/1915 | Wood . |
| 1,294,531 | 2/1919 | Pennington . |
| 2,047,643 | 7/1936 | Mayer . |
| 2,073,148 | 3/1937 | Gayford . |
| 2,143,669 | 1/1939 | Weinig . |
| 2,182,442 | 12/1939 | Booth . |
| 2,243,302 | 5/1941 | Weinig . |
| 2,411,288 | 11/1946 | Morse . |
| 2,433,592 | 12/1947 | Booth . |
| 2,711,823 | 6/1955 | Kihlstedt . |
| 3,647,066 | 3/1972 | Potts . |
| 3,773,179 | 11/1973 | Hurst . |
| 4,075,089 | 2/1978 | Saari . |
| 4,231,860 | 11/1980 | Kuznetsov . |
| 5,234,112 | 8/1993 | Valenzuela . |

*Primary Examiner*—Thomas M. Lithgow
*Attorney, Agent, or Firm*—Ridout & Maybee

[57] ABSTRACT

A flotation apparatus has an array of flotation cells which are in serial fluid flow communication from a first to a last cell. Each cell is in overflow communication with an overflow froth receiving receptacle which preferably has a top lip of slightly varying height in each cell. Air inlet and mechanical agitation are provided for each cell and are so positioned to promote an upright circular fluid flow in each cell toward the froth receiving receptacle. Each cell has internal surfaces shaped and oriented to promote the upright circular fluid flow and to discourage the creation of reverse eddy currents within the cell.

9 Claims, 4 Drawing Sheets

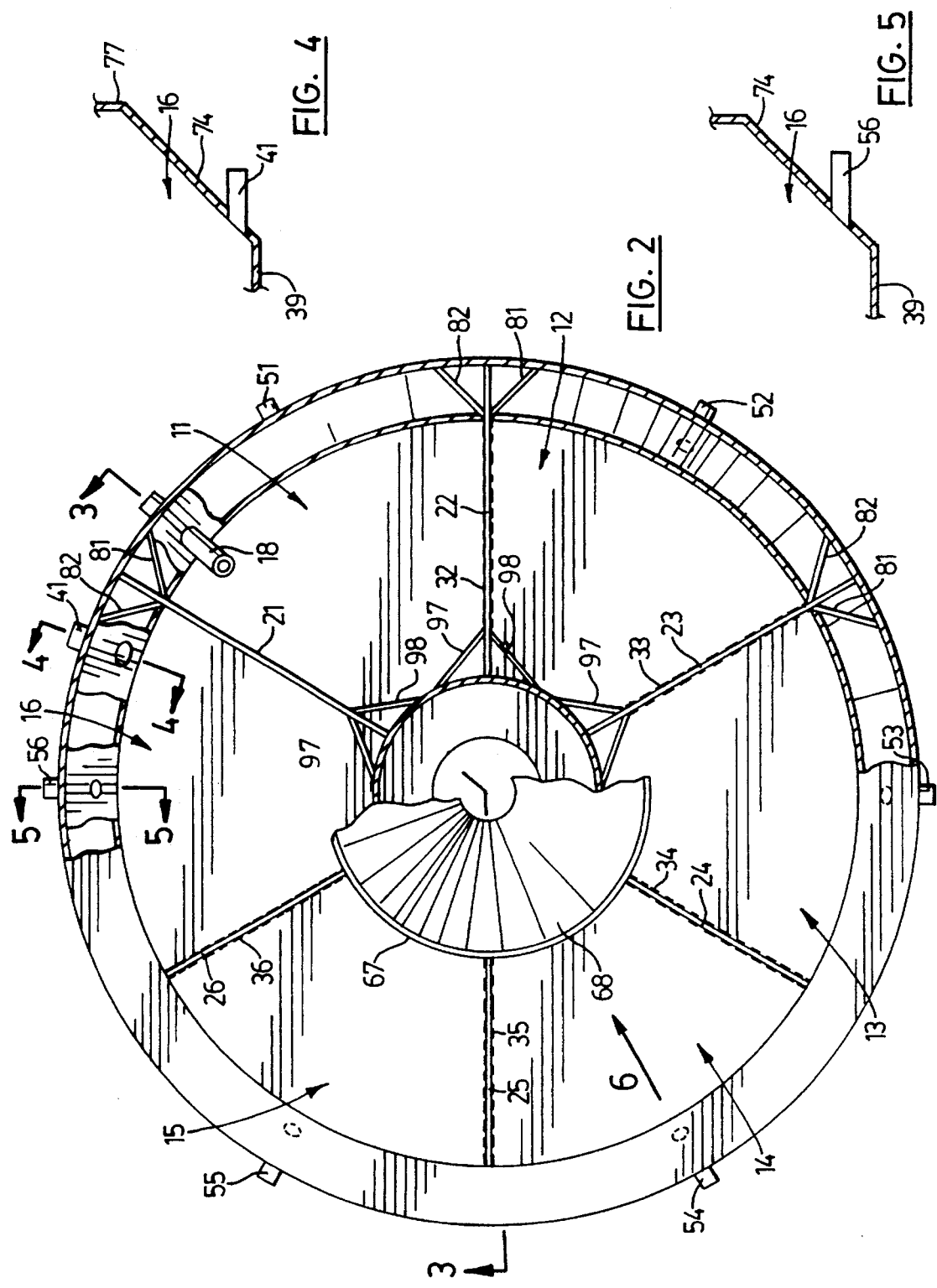

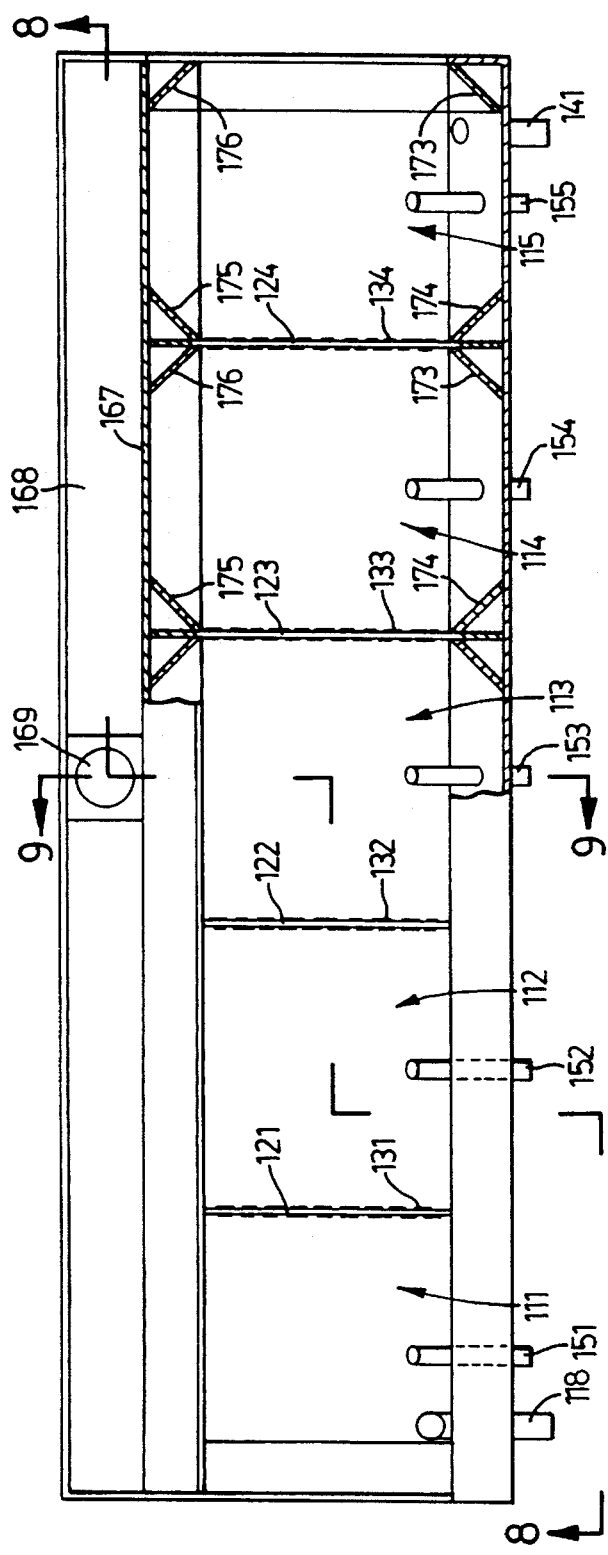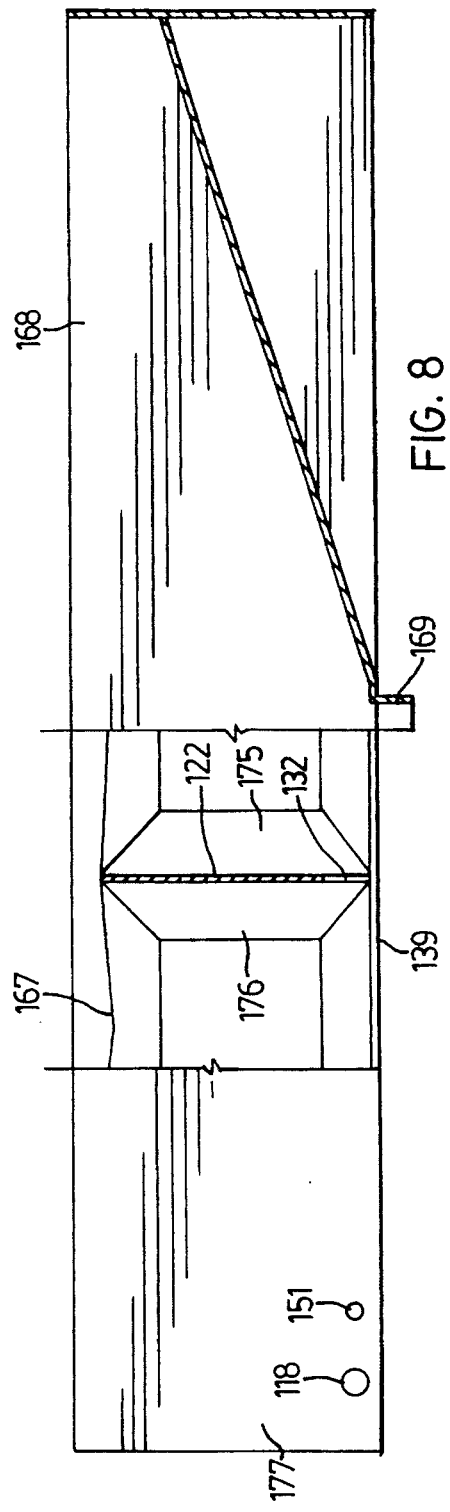

FLOTATION APPARATUS

The invention is a device for the separation of solid particles suspended in a fluid medium according to the flotation characteristics of the particles.

Flotation cells have been used in industry for many years, particularly in the mining industry where aqueous slurries of crushed ore are subjected to flotation for the purpose of separating mineral bearing particles from gangue. In a flotation process, bubbles and slurry particles must come into contact and particles of interest must selectively be attached to the bubbles through attractive forces provided by the compositions of the bubbles and the particles. In a successful flotation process, particles of interest must have sufficient residence time on the bubbles to allow the rising bubble froth to transport such particles out of the cell. Depending on the nature of the particles to be floated, large or small bubbles may be preferred, and a shallow or deep froth zone may be most suitable at the top of the cell.

Conventional flotation devices are generally inefficient because they require a relatively high energy input to effect a desired separation. Conventional flotation involves the use of mechanical agitators to maintain the particles in suspension as well as to aid in bubble formation which is primarily generated by an inflow of compressed air. The agitation conditions in a conventional flotation cell may be such that the residence time of particles on bubbles is not optimal or the time required for the particle-carrying bubble to exit the device is undesirably long, which may be caused, for example, by the presence of reverse eddy currents. Both circumstances result in a separation efficiency which is undesirable.

The present invention addresses the shortcomings of prior devices by providing a flotation apparatus having a plurality of flotation cells through which a particle slurry flows sequentially. Preferably, the number of cells in the apparatus is sufficient to ensure minimal back mixing, and thus, simulate plug flow of slurry through the apparatus. The invention utilizes cells having internal walls shaped and oriented to minimize undesirable turbulence, i.e., the formation of reverse eddy currents. Each cell is provided with an inlet for compressed air and a mechanical agitator which coact to create an upright circular fluid flow toward an overflow receiving means. The combined action of the agitator and inflowing air allows for the adjustment of bubble size and residence time in the cell to optimize the desired separation. The apparatus is versatile and can be used for a wide variety of flotation applications. The apparatus may comprise a linear or a circular array of cells.

Accordingly, the invention provides a flotation apparatus comprising an array of flotation cells which are in serial flow communication from a first inflow cell to a final outflow cell. Each cell is in overflow communication with an overflow receiving means. Each cell has means for introducing compressed air into a lower region of the cell, and each cell has mechanical agitation means coacting with introduced compressed air to create bubbles of a desired size profile. Each cell has side and bottom surfaces oriented to promote, in cooperation with the agitation means and compressed air flow, an upright circular fluid flow toward the overflow receiving means.

BRIEF DESCRIPTION OF THE DRAWINGS

FIG. 2 is a partially cut away plan view of the device.

FIGS. 4 and 5 are scrap sectional views on stations 4—4 and 5—5 respectively of FIG. 2.

FIG. 7 is a partially cut away plan view of a second preferred embodiment in which the cells are arrayed linearly.

FIG. 8 is a cross sectional view taken on the staggered section station 8—8 of FIG. 7.

The operation of a flotation apparatus of the invention will be described in the context of its use in a paper deinking process. As shown in FIG. 1, the preferred embodiment of the invention comprises an annular array of flotation cells 11–16 through which a slurry flows in a sequential manner. Slurry enters the apparatus through an inlet pipe 18 (FIG. 3) located at the bottom of the first cell 11, and preferably adjacent the sidewall 21 between the cells 11 and 16. The slurry proceeds through the cells 11–16 in a sequential fashion by means of openings 32–36 defined in cell walls 22–26. Preferably, the openings 32–36 are located directly above the bottom wall 39 of the apparatus. The openings 32–36 are sized in accordance with the desired flow rate for the slurry through the apparatus, which flow rate is preferably such as to minimize back mixing of slurry between adjacent cells. The openings 32–36 are also sized in accordance with the desired pressure drop across the cells of the apparatus. In a paper deinking process, a minimal pressure drop is preferred. The slurry exits the apparatus through an outlet pipe 41 (FIG. 4) extending from the cell 16. Preferably, the outlet pipe 41 is located at the bottom of the cell 16 near the wall 21. There is no direct flow communication between the cells 11 and 16, i.e., the cell wall 21 has no opening through it.

Figure 1:
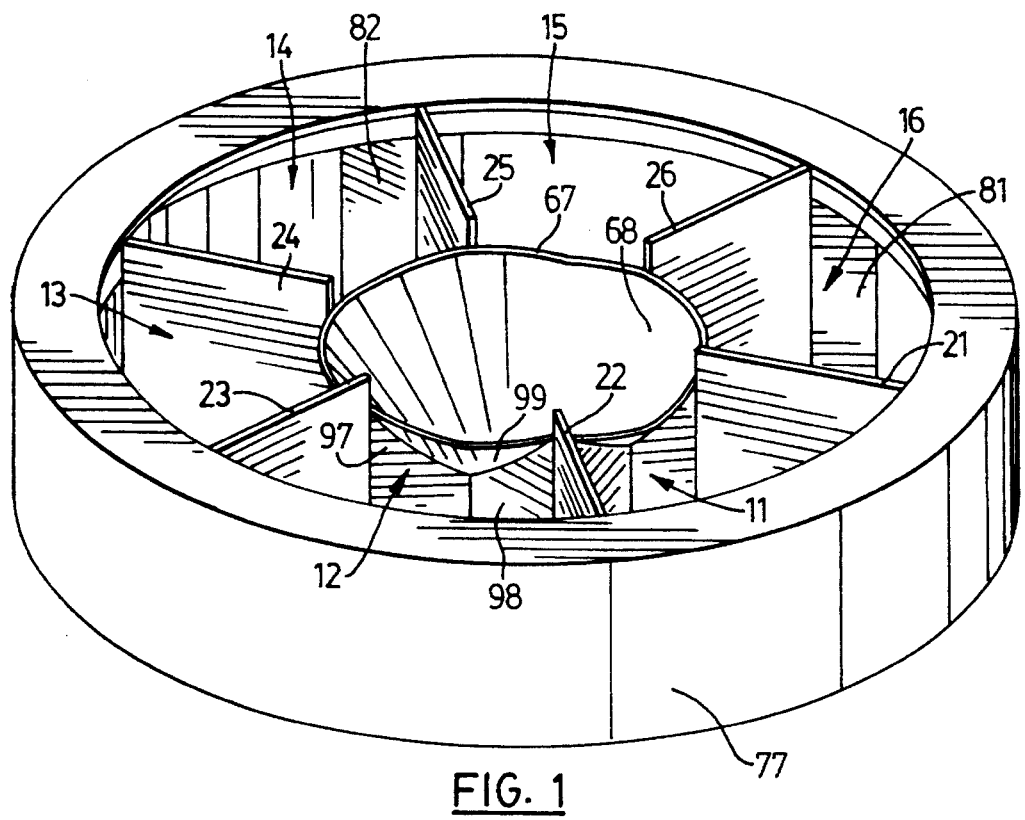
FIG. 1 is a perspective view of a preferred embodiment in which the cells are in a circular array.

The skilled person will appreciate that the inlet 18 may be located at other positions in the cell 11 in accordance with particular process objectives. In this, as well as other aspects, the configuration of the apparatus of the invention is flexible.

Flotation is provided in each cell 11–16 by the combined introduction of compressed air into each cell 11–16 and the provision of mechanical agitation in each cell 11–16. Compressed air enters each cell 11–16 through air inlet pipes 51–56 located centrally in each cell adjacent the bottom wall 39 (FIG. 5). The air inlet pipes 51–56 may be equipped with spargers. A mechanical agitator 59 is provided for each cell 11–16 to coact with inflowing compressed air to generate a flotation froth in the slurry passing through each cell. Preferably, each agitator 59 comprises an impeller 61 affixed to a shaft 62 which is driven by a motor 63. This combination of mechanical agitation and compressed air inflow allows for the control of bubble forming conditions within the slurry so that the desired bubble size and froth makeup can be achieved to provide optimum operating conditions. The skilled person will appreciate that the agitator 59 may be located in several alternative positions in each cell 11–16, and the impeller 61 may operate to provide a fluid flow cocurrently or countercurrently to the upward movement of bubbles. Again, this feature is designed to provide flexibility so that optimum operating conditions for the apparatus can be obtained.

Figure 3:
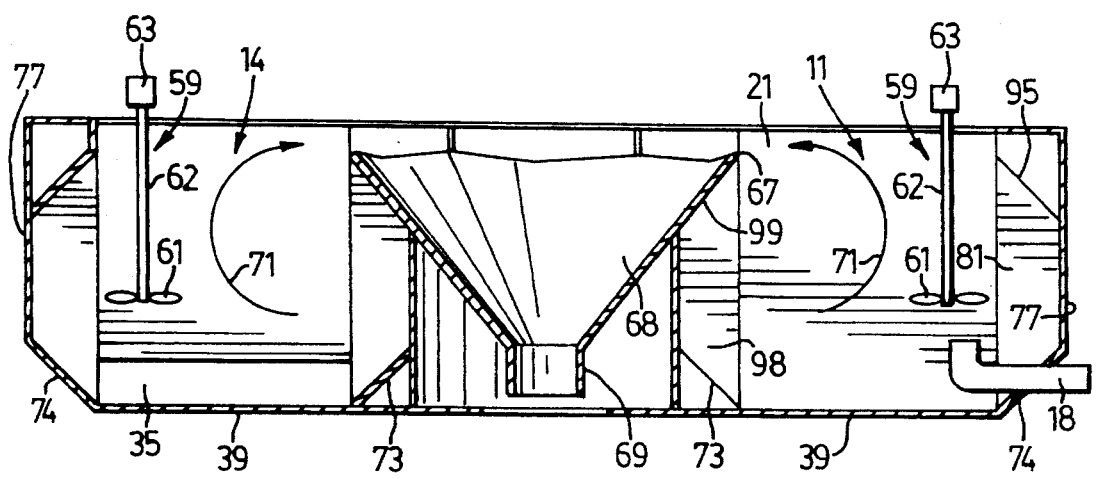
FIG. 3 is a cross sectional view taken on 3—3 of FIG. 2.

The froth formed in each cell 11–16 overflows a central annular lip 67 of a froth receptacle 68 provided centrally within the apparatus. Preferably, the central receptacle 68 is generally conical in shape, tapering to a pipe 69 for transporting the fluid and particulate material deposited into the receptacle 68 to another stage of the process. Clearly, the annular lip 67 is the lowest upper edge for any side wall of a cell 11–16, thereby allowing each cell to be in overflow communication with the central receptacle 68. The skilled person will appreciate that the velocity of fluid flow over the lip 67 may be varied by changing the circumference of the lip 67. Also, as shown in FIGS. 1 and 3, the shape of the lip 67 in each cell 11–16 preferably forms a shallow V. This shallow V-shape provides an uneven height to the lip 67 so that fluid level differences due to pressure differentials across the cells of the apparatus will not result in a failure of froth overflow in a cell having a relatively low fluid level. The height variation of the lip 67 also enables the purposive creation in a downstream cell of an overflow only at the lower central portions of the lip 67, thereby producing a higher relative overflow velocity in that cell as compared to a cell where overflow occurs along the entire lip length. In a paper deinking process, this higher downstream overflow velocity at the lip 67 provides an advantageous extra cleaning effect to the pulp fibers.

Figure 6:
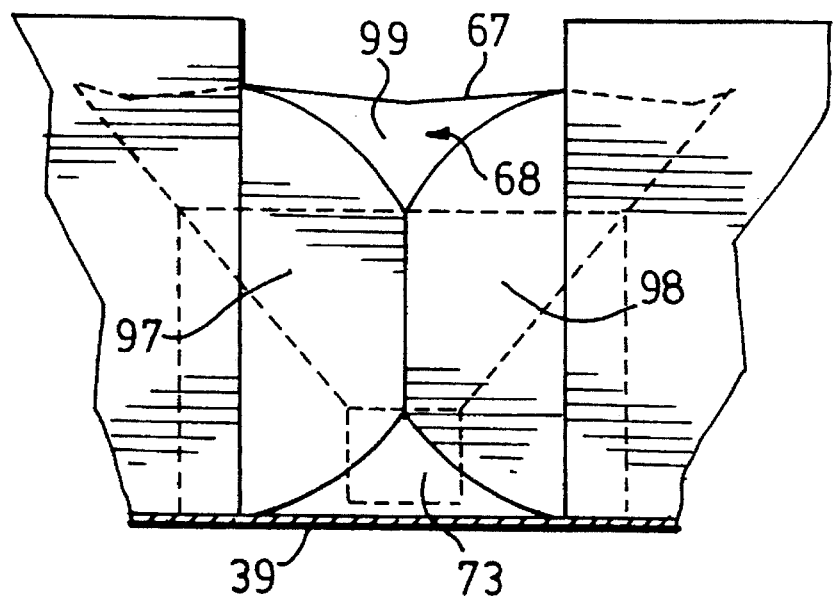
FIG. 6 is a perspective view of a front wall configuration of a cell of the device.

While the flow of slurry from cell to cell is driven primarily by fluid pressure provided by the inflow through the inlet pipe 18, the agitator 59 and inflowing air coact to create an upright circular flow 71 (FIG. 3) in each cell 11–16, thereby promoting the overflow of froth into the receptacle 68. This upright circular flow 71 is further promoted by the structural configuration of each cell. As seen particularly in FIG. 3, each cell 11–16 preferably has downwardly slanting lower front and rear walls 73 and 74 which are joined to the bottom 39. Each cell 11–16 has opposing rear upright sidewalls 81–82 (FIG. 2) which extend from a radial upright sidewall to the rear walls 74 and 77. A preferred orientation is for each rear sidewall 81–82 to form an angle of about 135° with its associated radial wall 21–26. Importantly, the upper part of the annular rear wall 77 in each cell 11–16 is slanted forwardly by, for example, attaching a plate 95 (FIG. 3) at a forward acute angle to the wall 77 and opposing rear sidewalls. Preferably, the plate 95 is attached at its lower edge to the rear wall 77 with a forward tilt of about 45°. Each cell 11–16 has a pair of front walls 97 and 98 positioned at an obtuse angle relative to one another, and each wall 97 and 98 have a top edge extending downwardly from the junction with a radial sidewall to the junction with the adjacent front wall so that an upper portion 99 of the central receptacle 68 extends into the cell (FIGS. 1 and 6).

The combination of surfaces provided by the described wall configuration in each cell 11–16 assists the agitators 59 and inflowing compressed air to create an upright circular fluid flow 71 in each cell 11–16 which increases the overflow communication of the froth with the central receptacle 68. In conjunction with this upright circular fluid flow 71 generated in each cell 11–16, it is highly desirable to discourage the formation of reverse eddy currents which trap bubbles and slurry, thus reducing the efficiency of the separation. The front wall combination 97–99 is configured so as to optimally discourage reverse eddy formation in the fluids at the front of each cell 11–16. The skilled person will appreciate that the contours of the internal cell walls can be altered to further enhance the desired upright circular fluid flow 71 in each cell 11–16 and to reduce reverse eddy formation even further. Thus, by introducing curved surfaces into the interiors of the cells 11–16 additional efficiencies in this regard may be realized.

In operation, the flotation of particles of interest in each cell 11–16 proceeds with the smooth transport of bubbles upwardly through each cell and to the central receptacle 68. A froth layer is created atop the slurry in each cell 11–16, and that froth layer is urged toward the central receptacle 68 by the fluid flow dynamics of each cell. The top lip 67 of the receptacle 68 acts as a doctor blade for the smooth separation of froth from the underlying slurry. The preferred V-shape of the lip 67 in each cell 11–16 provides a varying height for the overflow of froth into the receptacle 68. As mentioned, this varying lip height, preferably tapering downward to a midpoint, provides the apparatus with an important degree of flexibility in process conditions. The skilled person will appreciate that the described structure and operation of each flotation cell overcomes problems inherent in prior devices and provides clear advantages over the prior art.

The embodiment described with reference to FIGS. 1–6 contains six cells, but the number of cells contained in an apparatus of the invention will depend to some extent on the application for which the apparatus is intended. Basically, sufficient cells should be provided in the device to reduce back flow mixing between cells to a satisfactory level. With six cells or more, it is possible to approximate the theoretical plug flow through the apparatus. Clearly, the simulation of a plug flow of fluid through the apparatus is a highly desirable feature as it bears directly on the overall flotation efficiency of the device.

The flotation apparatus of the invention is particularly useful in a process such as the deinking of paper for recycling purposes where the initial slushing of a mixed paper feedstock results in the generation of a paper fiber slurry and floatable particulate matter including coarse ink particles and other low density coarse particles like plastics. The apparatus is capable of providing a high flow rate of large bubble froth into the central receptacle 68. The combination of compressed air and upflow mechanical agitation as described provides a means for generating the desired large bubble froth in an efficient fashion, i.e., at an acceptably low horsepower. The apparatus enables the operator to control the bubble size makeup of the froth as well as the froth height, and to control the distribution of rejects to the overflow central receptacle 68 versus accepts through the outlet 41. Importantly, the flotation within each cell 11–16 proceeds at an acceptably low level of turbulence, i.e., reverse eddy currents, so that the desired removal of coarse particles is efficiently achieved as the slurry moves through the apparatus.

Figure 9:
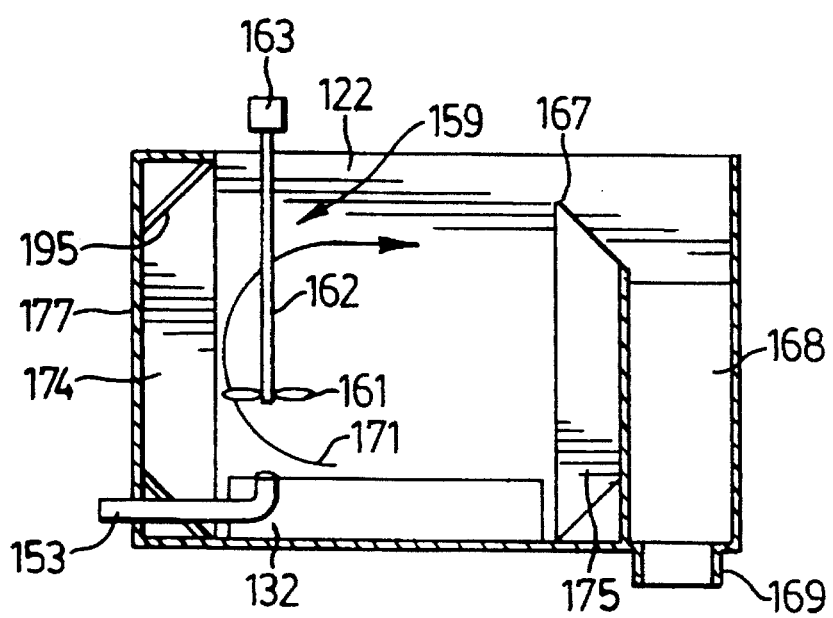
FIG. 9 is a cross sectional view taken on 9—9 of FIG. 7.

While the embodiment illustrated in FIGS. 1–6 has an annular array of flotation cells, the invention includes a device in which the cells are serially connected in other geometrical configurations. The annular embodiment described is thought to be particularly convenient and economical for most applications; however, by way of further illustration of the invention, a device is shown in FIGS. 7–9 wherein a plurality of cells 111–115 are linearly arrayed.

Internal walls 121–124 have openings 131–134 at the bottom 139 of the apparatus which provide flow communication between adjacent cells. Slurry is introduced into the apparatus through an inlet 118 in the first cell 111 and fluid exits the apparatus through an outlet 141 in the final cell 115. Compressed air is provided to each cell 111–115 through inlets 151–155 located in the lower region of each cell, preferably through the rear wall 177 adjacent the bottom 139 of the device. A mechanical agitator 159 is provided in each cell 111–115 (FIG. 9). Preferably, each agitator 159 has an impeller 161 affixed to a shaft 162 which is driven by a motor 163. The agitator 159 and inflowing compressed air coact to create the desired bubble makeup and to generate an upright circular fluid flow 171 as described above.

The froth formed in each cell 111–115 overflows the front top edge 167 of each cell into a froth receptacle 168 which is tapered downwardly to a pipe 169 for transporting the deposited material to another process stage. As previously described, the internal walls of each cell 111–115 are oriented and shaped to discourage the formation of reverse eddy currents, and thus, to promote the smooth flow of bubbles upwardly through the cell and toward the froth receptacle 168. Thus, the corners of each cell are provided with chamfering upright members 173–176. Likewise, the upper part of the rear wall 177 is provided with an outwardly and upwardly angled transverse member 195 to promote the desired upright circular flow 171.

It will be appreciated from the foregoing that the invention possesses a high degree of versatility and may be adapted to a wide variety of applications. Thus, the description herein is not intended to limit the scope of protection afforded the invention as defined in the following claims.

I claim:

1. A flotation apparatus for the separation of solid particles suspended as a slurry in a fluid medium, comprising:

an annular array of flotation cells which are in serial fluid flow communication from a first inflow cell to a final outflow cell so that a particle slurry may flow sequentially through the apparatus, the first cell having fluid inlet means for introducing a feed slurry containing floatable particles into the apparatus and the final cell having fluid outlet means for removing processed slurry from the apparatus;

centrally positioned within the annular array of cells is an overflow receiving means which is in overflow fluid flow communication with each cell for accepting a particle laden froth generated in each cell;

air inlet means positioned in a lower region of each cell for introducing compressed air into each cell;

mechanical agitation means for each cell; and internal surfaces located in each cell which are shaped and oriented to provide in conjunction with inflowing compressed air and mechanical agitation an upright circular fluid flow in each cell toward the overflow receiving means.

2. A flotation apparatus as claimed in claim 1, comprising six flotation cells.

3. A flotation apparatus as claimed in claim 1, wherein the fluid flow communication between adjacent cells is provided by an opening defined in each common wall between adjacent cells.

4. A flotation apparatus as claimed in claim 3, wherein the openings are located in a lower portion of said common wall.

5. A flotation apparatus as claimed in claim 1, wherein the mechanical agitation means comprises an impeller attached to a shaft which is driven by a motor.

6. A flotation apparatus as claimed in claim 1, wherein the mechanical agitation means is positioned eccentrically within each cell.

7. A flotation apparatus as claimed in claim 6, wherein the mechanical agitation means is positioned above the air inlet means.

8. A flotation apparatus as claimed in claim 1, wherein the internal surfaces for each cell include upright corner chamfering members.

9. A flotation apparatus as claimed in claim 1, wherein the internal surfaces for each cell include a rear wall having an outwardly and upwardly angled transverse member extending from the top portion thereof.

* * * * *